United States Patent [19]

Scheer

[11] Patent Number: 4,994,519
[45] Date of Patent: Feb. 19, 1991

[54] RUBBER-TO-METAL BINDERS FROM CHLORINATED RUBBER AND BROMINATED POLYDICHLOROBUTADIENE

[75] Inventor: Hans Scheer, Düsseldorf, Fed. Rep. of Germany

[73] Assignee: Henkel Kommanditgesellschaft auf Aktien, Duesseldorf-Holthausen, Fed. Rep. of Germany

[21] Appl. No.: 153,903

[22] Filed: Feb. 9, 1988

[30] Foreign Application Priority Data

Feb. 11, 1987 [DE] Fed. Rep. of Germany ....... 3704152

[51] Int. Cl.$^5$ .......................... C08L 15/02; C08K 5/33
[52] U.S. Cl. ................................... 524/519; 428/461; 524/186; 524/526; 525/343
[58] Field of Search ....................... 524/186, 519, 526; 525/236, 346, 377

[56] References Cited

U.S. PATENT DOCUMENTS 3,804,798 4/1974 Cantor ............................... 525/377
3,826,772 7/1974 Gebhard et al. .

FOREIGN PATENT DOCUMENTS 877923 10/1958 United Kingdom .

Primary Examiner—Christopher Henderson
Attorney, Agent, or Firm—Ernest G. Szoke; Wayne C. Jaeschke; Henry E. Millson, Jr.

[57] ABSTRACT

A heat-stable binder for use in the vulcanization of natural or synthetic rubber mixtures onto metallic or other substrates, comprising a mixture which is free from oxidizing agents that oxidize quinone dioxime and which contains chlorinated rubber, after-brominated dichloropolybutadiene, and quinone dioxime.

8 Claims, No Drawings

RUBBER-TO-METAL BINDERS FROM CHLORINATED RUBBER AND BROMINATED POLYDICHLOROBUTADIENE

BACKGROUND OF THE INVENTION

1. Field of the Invention

This invention relates to primers or binders for the production of composite structures by vulcanization of rubber mixtures onto metals and other substrates stable under vulcanization conditions.

2. Statement of Related Art

For economic reasons, higher vulcanization temperatures and shorter heating times are being increasingly used in the rubber-processing industry for the production of rubber/metal metal composites. To obtain the desired values, particularly of natural rubber mixtures, necessary in rubber technology under such modified vulcanization conditions, it is necessary to use low-sulfur crosslinking systems. However, such systems have a distinct effect on bonding behavior, generally an adverse effect. Defective composites are often obtained, particularly when metal parts coated with binder are additionally exposed to prolonged preheating.

DESCRIPTION OF THE INVENTION

Other than in the operating examples, or where otherwise indicated, all numbers expressing quantities of ingredients or reaction conditions used herein are to be understood as modified in all instances by the term "about".

An object of the present invention is to provide a rubber-to-metal binder which shows good resistance to preheating under the described vulcanization conditions and which leads to good bonds between rubber and substrate, particularly in the case of natural rubber mixtures, but also in the case of synthetic rubber mixtures such as those of styrene-butadiene rubber, nitrile rubber, or butyl rubber.

According to the invention, this object is achieved by a heat-stable rubber-to-metal binder as an auxiliary in the vulcanization of natural or synthetic rubber mixtures onto metallic or other rigid substrates, consisting of mixtures based on chlorinated rubber, after-brominated dichloropolybutadiene, and quinone dioxime and wherein the binders are free from oxidizing agents for the quinone dioxime.

In one particular embodiment, the binders of the invention contain from 1 to 30% by weight and more especially from 5 to 25% by weight sulfur, based on the sum of chlorinated rubber and after-brominated dichlorobutadiene. It is also of advantage if up to 15% by weight, e.g., from 1 to 15% by weight, based on the above two constituents, of carbon black is present therein.

The rubber-to-metal binders of the invention are based on chlorinated rubber which has long been used as a raw material for the production of such compositions. Another essential constituent is after-brominated polydichlorobutadiene which has also been used for decades for this purpose. The use of carbon black, together with the above two components and numerous other auxiliaries, is also commonplace in rubber technology. In this connection, one skilled in this art knows which types of carbon black are suitable or is capable of finding a suitable type of carbon black by simple tests.

It has also long been standard practice to mix these constituents with p-dinitrosobenzene. Attempts have already been made to replace this material and to use instead p-quinone dioxime together with an oxidizing agent, so that the effective p-dinitrosobenzene is formed at the temperatures required for the vulcanization or preheating step.

However, it has hitherto been opined that quinone dioxime as such is not effective and can only be used together with an oxidizing agent. This prejudice has been overcome by the present invention which shows that quinone dioxime can in fact lead to good rubber-to-metal bonds if it is used together with the constituents normally used, namely chlorinated rubber, after-brominated polydichlorobutadiene and preferably carbon black. It has also proved to be of particular advantage to add from 1 to 30% by weight, preferably from 5 to 25% by weight of ground sulfur to the binders in addition to these constituents.

To prepare the rubber-to-metal binders, the individual components are preferably first dissolved or suspended in an organic solvent or a mixture of compatible organic solvents. Preferred solvents are ketones or esters, such as methyl ethyl ketone, methyl isobutyl ketone, diethyl ketone, ethyl acetate, ethylene glycol diacetate, and butyl acetate. Other suitable solvents are chlorinated hydrocarbons, such as trichloroethane, trichloroethylene, perchloroethylene, and aromatic solvents, such as toluene or xylene. The quantity of solvent used may vary over a wide range although, in general, the solvent will be used in such a quantity that the binder or primer has a solids content of from 5 to 40% by weight dry matter. In one advantageous embodiment, a suspension or solution in one of the above solvents is employed which has a content of from 3 to 90 parts by weight chlorinated rubber, from 5 to 40 parts by weight after-brominated polydichlorobutadiene, from 5 to 20 parts by weight carbon black, from 5 to 30 parts by weight quinone dioxime and from 1 to 25 parts by weight ground sulfur. In many cases, it has proven to be advisable to coat the metal parts to be joined with a primer before application of the binder in accordance with the prior art.

Primers for rubber-to-metal binders are well known and may consist of solutions or suspensions of chlorinated rubber and phenolic resins still containing reactive groups and also pigments, such as for example titanium dioxide, zinc oxide, carbon black or the like. They are applied in relatively thin layers after the usual pretreatment of the surfaces by blasting with steel grit, degreasing with solvents, etc.

After application of the primer and coating with the binder, the solvent is allowed to evaporate thoroughly. When the binder films are dry, the metal parts are fed into the press. After preheating to the appropriate temperature, the rubber mixture is applied and the actual vulcanization is carried out for 3 to 15 minutes at 120° to 190° C. and under pressure. The vulcanization conditions are dictated by the rubber mixtures used and should be adapted both to the vulcanization behavior thereof and to the substrate to be bonded.

The rubber-to-metal binders according to the invention are suitable for bonding natural and synthetic rubber to metals and other solid substrates, such as plastics, wood and even fabrics, in the course of vulcanization. Appropriate pretreatment of the surfaces is of course necessary. It is even possible to join different types of rubber to one another using the rubber-to-metal binder of the invention.

One particular advantage of the invention is that it provides a binder free from oxidizing agents, which nonetheless has many of the advantages of binders containing dinitrosobenzene and binders containing quinone dioxime plus oxidizing agent. Another remarkable feature of the binders of the invention is their high resistance to preheating which is distinctly further improved in the presence of sulfur and thus leads to improved bonds.

The invention will be illustrated but not limited by the following examples.

EXAMPLES

In the following Examples, the tests were performed on steel in accordance with ASTM-D429, method B and C. The surfaces were pretreated by degreasing with trichloroethane, steam, and blasting with chilled cast-iron grit. The vulcanization process was carried out in a standard press. The tensile tests were carried out after storage of the composite structures for 24 hours at room temperature.

Binders were prepared by suspending or dissolving
146 g chlorinated rubber
62 g brominated dichloro-2, 4-polybutadiene
11 g lead phosphite
21 g carbon black
in a mixture of
640 g xylene and
120 g perchloroethylene.

The following components were then dispersed in this basic formulation by stirring:
(1) 20 g p-quinone dioxime
(2) 40 g p-quinone dioxime
(3) 40 g p-quinone dioxime and 10 g ground sulfur
(4) 40 g p-quinone dioxime and 20 g ground sulfur.

To test bond strength to steel surfaces, the steel surfaces were pretreated with a standard primer for rubber-to-metal binders consisting essentially of a solution/suspension of 8 parts by weight chlorinated rubber and 8 parts by weight phenolic resin still containing reactive groups, 5 parts by weight titanium dioxide and 1.5 parts by weight each of zinc oxide and carbon black in 80 parts by weight methyl isobutyl ketone.

The rubber mixtures used had the composition shown in Table 1 below. The figures are parts by weight.

TABLE 1

| Constituents | I | II | III | IV |
|---|---|---|---|---|
| Natural rubber | 100 | 100 | — | — |
| Styrene-butadiene rubber | — | — | 100 | — |
| Acrylonitrile-butadiene rubber | — | — | — | 100 |
| Stearic acid | 2 | 2 | 1 | 1 |
| Zinc oxide | 5 | 5 | 5 | 5 |
| 2,2,4-trimethyl-1,2-dihydroquinoline | 1 | 1 | — | — |
| N-isopropyl-N-phenyl phenylenediamine | 1 | 1 | — | — |
| Paraffin wax | 1 | 1 | — | — |
| Carbon black N550 | 20 | 20 | — | — |
| Carbon black N330 | — | — | 50 | — |
| Carbon black N770 | — | — | — | 65 |
| Napthenic mineral oil | 3 | 3 | — | — |
| Polymerized hydrocarbons | — | — | 8 | — |
| Pinene-terpene resin | — | — | — | 10 |
| Dibutyl phthalate | — | — | — | 10 |
| Tetramethyl thiuram disulfide | 1.00 | 1.20 | — | — |
| Tetramethyl thiuram monosulfide | — | — | — | 0.31 |
| Dibenzothiazyl disulfide | — | 0.80 | — | — |
| Benzothiazyl-2-sulfenemorpholide | — | — | — | — |
| Benzothiazyl-2-cyclohexylsulfenamide | 2.20 | — | 0.95 | — |
| Morpholine disulfide | — | 0.75 | — | — |
| Sulfur, ground | 0.25 | 0.20 | 1.60 | 1.00 |

Adhesion testing on steel substrates was carried out in accordance with ASTM-D429, method C. Table 2 below shows the ultimate strength in kN in dependence upon the rubber mixture I–IV used and the binder according to Examples 1 to 4.

TABLE 2

| Rubber | Examples | | | |
|---|---|---|---|---|
| | 1 | 2 | 3 | 4 |
| I | 0.52 | 0.60 | 0.80 | 0.71 |
| II | 0.50 | 0.57 | 0.86 | 0.72 |
| III | 2.24 | 2.18 | 2.32 | 2.21 |
| IV | 2.27 | 2.26 | 2.41 | 2.38 |

To determine preheating resistance, the steel substrate was heated to 160° C. for 3, 5, 7 and 8 minutes before contact with the rubber mixture (rubber mixture I). Vulcanization of the rubber mixture onto the steel substrate was also carried out at 160° C. over a period of 10 minutes.

Testing in accordance with ASTM-D429, method B, produced the peel values (in daN/2.5 cm) shown in Table 3 below and the peel patterns in % rupture in the rubber layer as defined in ASTM (=% R).

TABLE 3

| Binder/Example | Preheating time | | | | | | | |
|---|---|---|---|---|---|---|---|---|
| | 3 mins. | | 5 mins. | | 7 mins. | | 8 mins. | |
| | | % R | | % R | | % R | | % R |
| 1 | 14 | 10 | 7 | 0 | 0 | 0 | 0 | 0 |
| 2 | 20 | 20 | 12 | 5 | 10 | 0 | 9 | 0 |
| 3 | 32 | 100 | 29 | 100 | 24 | 8 | 18 | 20 |
| 4 | 28 | 100 | 25 | 100 | 25 | 100 | 24 | 100 |

COMPARISON TEST

A binder prepared as above but containing neither quinone dioxime nor sulfur was used and tested with rubber mixtures I–IV as set forth above. In no case was a bond obtained. The steel and rubber separated on removal from the vulcanization press.

I claim:

1. A heat-stable binder for use in the vulcanization of natural or synthetic rubber mixtures onto metallic or other substrates, comprising a mixture which is free from oxidizing agents that oxidize quinone dioxime consisting essentially of
   (a) from about 3 to about 90 parts by weight of chlorinated rubber,
   (b) from about 5 to about 40 parts by weight of after-brominated polydichlorobutadiene,
   (c) from about 5 to about 30 parts by weight of quinone dioxime,
   (d) from about 5 to about 20 parts by weight of carbon black, and
   (e) from about 1 to about 25 parts by weight of ground sulfur.

2. The binder of claim 1 wherein the binder is in the form of a solution or suspension in an organic solvent which contains from about 5 to about 40% by weight dry matter.

3. In a heat-stable binder for use in the vulcanization of natural or synthetic rubber mixtures onto metallic or other substrates, comprising a mixture of chlorinated rubber, after-brominated dichloropolybutadine, and quinone dioxime, the improvement wherein (a) the binder is free from oxidizing agents that oxidize the quinone dioxime, (b) the binder contains from about 1 to about 30% by weight of ground sulfur, and (c) the binder contains up to about 15% by weight of carbon black; wherein the percentages by weight are based on the weight of chlorinated rubber plus after-brominated dichloropolybutadiene.

4. The binder of claim 3 wherein from about 5 to about 25% of ground sulfur is present therein.

5. The binder of claim 3 wherein from about 1 to about 15% by weight of carbon black is present therein.

6. The binder of claim 3 wherein the binder is in the form of a solution or suspension in an organic solvent which contains from about 5 to about 40% by weight dry matter.

7. The binder of claim 4 wherein the binder is in the form of a solution or suspension in an organic solvent which contains from about 5 to about 40% by weight dry matter.

8. The binder of claim 5 wherein the binder is in the form of a solution of suspension in an organic solvent which contains from about 5 to about 40% by weight dry matter.

* * * * *